United States Patent

Rhoades et al.

[15] 3,705,339
[45] Dec. 5, 1972

[54] AUTOMATIC SERVOMOTOR CONTROL FOR LATHES PROVIDING SFM AND CHIP THICKNESS CONTROL

[72] Inventors: John M. Rhoades, Waynesboro; Carroll C. Cooper, Staunton, both of Va.

[73] Assignee: General Electric Company

[22] Filed: Aug. 22, 1969

[21] Appl. No.: 852,255

[52] U.S. Cl. ..................318/571, 318/39, 90/13, 235/151.11
[51] Int. Cl. ..................................................G05b 19/24
[58] Field of Search ....................318/39, 571; 90/13; 235/151.11

[56] References Cited

UNITED STATES PATENTS

| 3,582,749 | 6/1971 | Wenzel | 318/571 |
| 2,600,988 | 6/1952 | Greene et al. | 318/39 UX |
| 2,809,333 | 10/1957 | Wagner | 318/39 |

Primary Examiner—T. E. Lynch
Attorney—Frank L. Neuhauser, Oscar B. Waddell, Joseph B. Forman, Gerald R. Woods and William S. Wolfe

[57] ABSTRACT

An SFM control for automatically controlled lathes and other turning machines including feed supply means for automatically feeding a part being machined relative to a cutter tool of the lathe along at least one axis of movement. A spindle motor speed control is included for controlling the spindle speed of the lathe and a change-in-radius control is provided for deriving a speed control signal related to the change-in-radius of a part being machined on the automatically controlled lathe. The output speed control signal from the change-in-radius speed control is supplied to control the spindle speed controller whereby the spindle speed of the lathe is adjusted automatically with changes in radius of a part being machined to maintain a desired value of surface feet per minute (SFM) moving past the lathe cutter tool independently of the operation of the feed supply. The control may be operated in an SFM mode with or without chip thickness control or may be operated in an RPM mode with or without chip thickness control.

21 Claims, 9 Drawing Figures

FIG. I

INVENTOR.
JOHN M. RHOADES
CARROLL C. COOPER
BY Michael Masnik
HIS ATTORNEY

AUTOMATIC SERVOMOTOR CONTROL FOR LATHES PROVIDING SFM AND CHIP THICKNESS CONTROL

BACKGROUND OF INVENTION

1. Field of Invention

This invention relates to a new and improved technique and automatic control for lathes providing either SFM or SFM and chip thickness control of an automatic contouring controlled lathe.

More particularly, the invention relates to a technique and automatic control for lathes which operate in accordance with digital numerical control techniques, and selectively may be operated in an SFM mode with or without chip thickness control, or may be operated in an RPM mode with or without chip thickness control.

2. Statement of Prior Art Problem

Extensive studies and researches in the field of metalcutting machine tools have demonstrated that a very important factor affecting the efficiency and the quality of cutting in a machine tool such as a lathe is the cutting speed. That is, the relative speed between the cutter tool tip and the surface of the part or workpiece being machined.

In a lathe the cutting speed S can be expressed as $S = 2\pi wr$ where $w$ = angular speed of the spindle and workpiece and $r$ = actual radius of the workpiece in correspondence with the cutter tool tip. For any tool material and workpiece material involved in a given cutting operation, a certain speed range (subject also to the shape of the tool and the dimension of the cut chip, i.e., chip of material being removed from the workpiece or part being machined) can be chosen which will optimize the working speed, the quality of the cutting and the life of the cutter tool.

In the old conventional lathes, automatic control of the cutting speed was not provided so that the operator had to manually change the speed of the spindle any time that the workpiece radius of the part being machined changed by any relevant amount. This, of course, proved unsatisfactory because of the wide variation in operator skills, and led to efforts to provide automatic speed control of the spindle of the lathe. One prior art form of a spindle speed control utilized mechanical slaving of a continuous variable speed transmission (belt and two expanding driving pulleys) to the cross slide of the lathe. This improvement was considered quite effective provided the feed rate of the tool, that is the longitudinal and transverse speed or rate at which the tool is moved relative to the workpiece along the work contour (profile), is manually controlled by the operator. However, such an arrangement is unacceptable when applied to lathes in which other kinds of automatic control features are provided.

In order to better appreciate why the above briefly described speed control arrangement is unacceptable for automatically controlled lathes, some appreciation of the fundamental elements, definitions and relationships involved in the controlling process, is required and are set forth hereinafter:

$w$ = angular speed of the spindle in revolutions per minute
$S$ = cutting speed (SFM) in surface feet per minute
$r$ = actual radius of the workpiece in inches
$t$ = undeformed thickness of the chip being removed tangent to the workpiece surface in inches
$v$ = feed rate of the tool along the workpiece contour in inches per minute
$v_z$ = longitudinal feed rate of the tool in inches per minute
$v_y$ = cross (or transverse) feed rate of the tool in inches per minute
$d$ = depth of cut in inches
$s$ = undeformed chip section in square inches
$K$ = a constant which is related to cutting speed, material hardness, tool sharpness and many other factors
$F$ = force exerted by the tool in the direction of the relative movement between the tool and the work surface in pounds
$T$ = torque exerted by the tool on the workpiece in pound feet
$P$ = resistance power exerted in the cutting operation in horsepower The fundamental relationships involved in the cutting process and describing the interrelationships of the above-listed parameters are the following:

$$S = 2\pi w r/12 = \pi/6 \cdot w \cdot r \text{ (feet per minute)} \quad (1)$$

$$t = v/w \text{ (inches per revolution)} \quad (2)$$

$$s = t \cdot d \text{ (inches}^2\text{)} \quad (3)$$

$$F = K \cdot s = K \cdot t \cdot d \text{ (pounds)} \quad (4)$$

$$T = F \cdot r/12 = K \cdot t \cdot d \cdot r/12 \text{ (pound-feet)} \quad (5)$$

$$P = 2\pi T \cdot w/33,000 = K \cdot t \cdot d \cdot r \cdot w/63,000 \text{ (horsepower)} \quad (6)$$

$$P = 2\pi K \cdot t \cdot d \cdot 6s/33,000 \cdot 12 \cdot \pi = K \cdot t \cdot d \cdot S/33,000 \text{ (horsepower)} \quad (7)$$

From a consideration of the above list of equations, several concepts emerge.

a. If the angular velocity $w$ is held constant, the cutting speed $S$ varies proportional to the radius.
b. In order to obtain a constant cutting speed $S$ in surface feet per minute, it is necessary to maintain the angular speed of the spindle inversely proportional to the cutting radius $r$ as it changes.
c. Constant chip thickness $t$ is obtained by maintaining the feed rate of the tool $v$ proportional to the angular speed $w$.
d. The cutting force $F$ acting along the line of motion off the cutting speed $S$ is essentially a direct proportional function of the undeformed chip area $s$ over the normal range of cutting conditions.
e. The cutting torque $T$ is essentially a direct proportional function of the product of the undeformed chip area $s$ and the cutting radius $r$ over the normal range of cutting conditions.
f. If the cutting speed $S$ and the chip area $s$ are maintained constant with changes in cutting radius, the cutting power $P$ will remain constant.
g. As the tool sharpness decreases or the workpiece hardness increases, the constant $K$ will increase, thereby increasing the required cutting force $F$ and torque $T$. If the control is simultaneously maintaining constant cutting speed $S$ and constant chip thickness $t$, the cutting power $P$ and cutter temperature will increase. Alternatively, if the control is simultaneously maintaining constant power $P$ and constant chip thickness, the cutting speed will be decreased and the tool temperature will return to approximately that magnitude which preceded the increase in the constant $K$.

All of these parameters affect the quality of the cutting and the efficiency of the machining operation.

It has been proposed to control the feed rate $v$ as a function of angular velocity $w$ irrespective of the amount of its components $v_z$ and $v_x$. There are a number of prior art controls which are intended for this purpose and employ as a controlling means a tracing or copying stylus. Even in these prior art cases, however, the optimum solution to the problem has not been provided since control of the cutting speed $S$ is not included.

There are no known automatic controls for lathes which in connection with the above briefly outlined problem control the parameters of $t$ and $S$ involved in the cutting operation of a lathe except those described briefly above, and these do not provide an integral approach to the solution of the problem of suitably operating and automatically controlling a lathe. Such an integral approach to the problem is provided by the subject invention.

The first step in this integral approach consists in providing a means for controlling the chip thickness. This is suitably achieved in the instant invention, using digital numerical control techniques, by slaving the feed rate $v$ to the angular speed of the spindle $w$ so that $v$ is proportional to $w.w$ in its turn can be numerically programmed according to the actual radius (in the average) of the workpiece at any given instant of a machining operation, so that at the same time, a suitable cutting speed is achieved.

The second step consists in programming a constant suitable surface cutting speed $S$. It is believed clear that if the two parameters $S$ and $t$ are kept constant, the objective of keeping the cutting conditions constant also is achieved, and further that the cutting force $F$ likewise will be kept constant, thus minimizing the risk of tool chattering. A general purpose automatic control for lathes can be made available which selectively can be made to operate using either the SFM or RPM mode of operation, and that while operating in either mode, chip thickness control may or may not be used depending upon the type of machining operation desired.

SUMMARY OF INVENTION

It is therefore a primary object of the present invention to provide a new and improved technique and automatic control for lathes providing either SFM or SFM and chip thickness control for automatic contouring controlled lathes.

A further object of the invention is to provide a technique and automatic contouring control for lathes which operates in accordance with digital numerical control techniques, and selectively may be operated in an SFM mode with or without chip thickness control, or may be operated in an RPM mode with or without chip thickness control.

In practicing the invention, an SFM control for automatically controlled lathes is provided which includes feed supply means for automatically feeding a part being machined relative to a cutter tool of the lathe along at least one axis of movement. Spindle motor speed control means are provided for controlling the spindle speed of the lathe. The SFM control is completely by change-in-radius speed control means for deriving a speed control signal related to the change in radius of a part being machined on the automatically controlled lathe. The output speed control signal from the change-in-radius speed control means is supplied to control the spindle speed control means whereby the spindle speed of the lathe is adjusted automatically with changes in radius of a part being machined to maintain a desired value of surface feet per minute moving past the lathe cutter tool independently of the operation of the feed supply means.

In preferred embodiments of the invention, the SFM control further includes a chip thickness control feature comprised by encoder means coupled to the lathe spindle for deriving a spindle speed indicating control signal representative of the spindle speed of the lathe. Means are provided for slaving the operation of the feed supply means to the spindle speed to thereby automatically slave the feed rate operation of the lathe through the lathe spindle speed through the medium of the spindle speed indicating control signal whereby the feed rate and hence chip removal can be made proportional to the spindle speed measured in surface feet per minute and a controlled thickness of chip removal can be achieved.

The preferred embodiment of the invention also further includes an RPM control feature together with mode select means for selectively disconnecting the change-in-radius speed control means from controlling the operation of the spindle motor speed control means and for connecting in RPM speed control means whereby the spindle speed of the lathe selectively may be operated in a desired value of surface feet per minute mode or a desired value of revolutions per minute mode at pre-programmed command speed with or without chip thickness control depending upon the type of machining operation desired.

It is preferred that the new and improved control be fabricated in accordance with digital numerical control techniques and include a spindle speed command counter coupled to control the spindle motor speed control means and capable of being pre-programmed with either command values of surface feet per minute of the part being machined (SFM) or selectively in accordance with pre-programmed values of revolutions per minute (RPM) of the lathe spindle. Additionally, where a multispeed range gear train is employed intermediate the spindle drive motor and the spindle of the lathe for operation in various different speed ranges, the control may further include gear range selector means coupled to and controlling the spindle motor speed control in accordance with a selected one of a plurality of predetermined speed range changing gear ratios.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 9 is a functional block diagram of still another different form of change-in-radius speed control counter arrangement suitable for use in practicing the invention.

DETAILED DESCRIPTION OF PREFERRED EMBODIMENTS

Overall System

Figure 1:
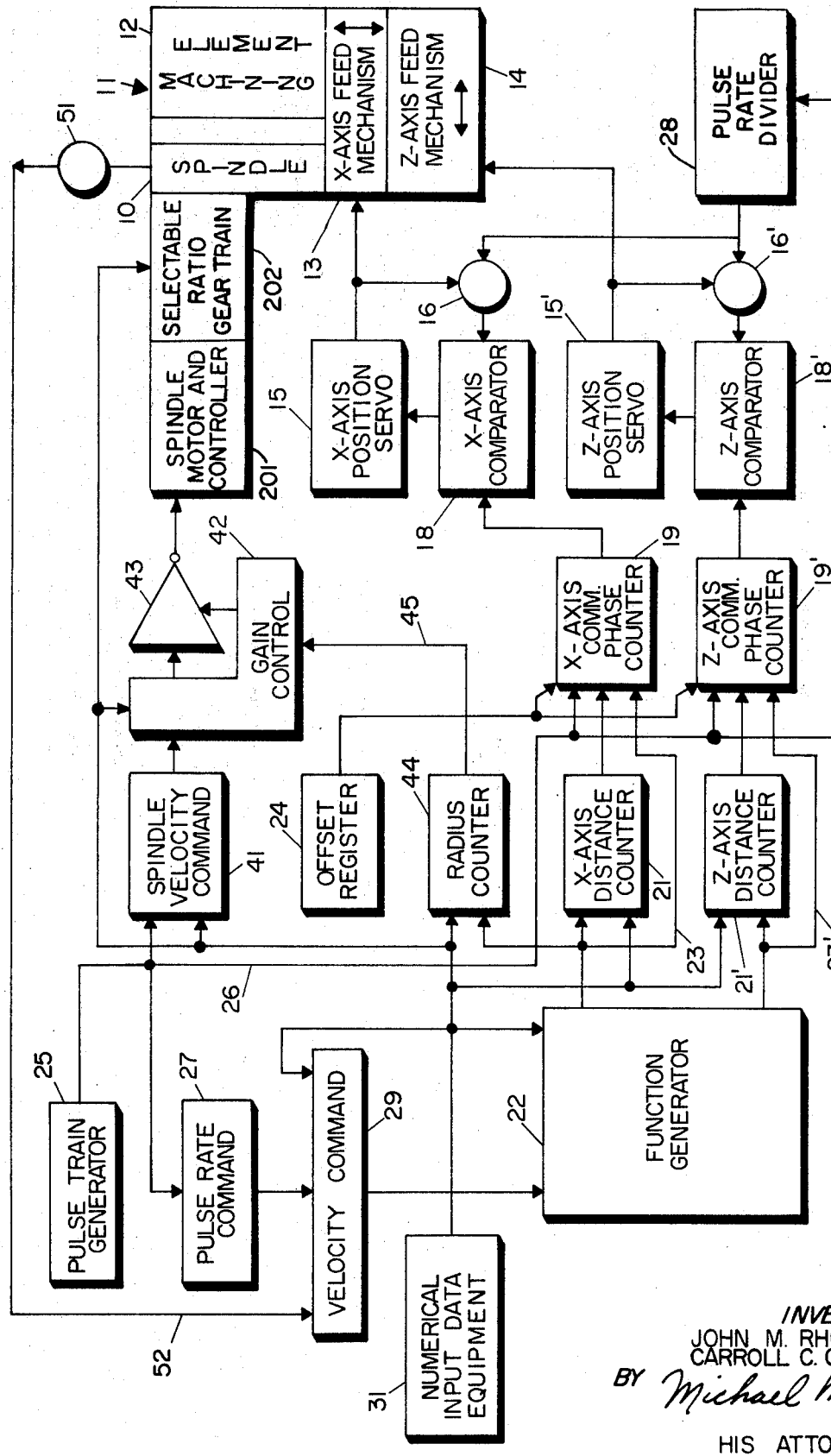
FIG. 1 is a functional block diagram of an overall SFM-RPM-Chip Thickness numerical control for a lathe constructed in accordance with the invention.

FIG. 1 is a functional block diagram of an overall SFM-RPM-chip thickness numerical contouring control for a lathe constructed in accordance with the invention. FIG. 1 illustrates the interrelationships of the three basic sections of the new and improved SFM-RPM-chip thickness numerical contouring control. These sections are comprised by the rather conventional X and Z axis feed mechanisms which control respectively the feed of the part being machined along the transverse X axis and longitudinal Z axis together with their associated digital operable control circuitry and includes the numerical input data equipment as well as the reference pulse train generating and deriving components of the control. The second broad section of the overall control is comprised by a change-in-radius speed control section including a radius register for automatically changing the spindle speed in accordance with changes in the radius of a part being machined whereby SFM control of the machining process is affected. The third basic section of the overall control is comprised by the chip thickness control circuit elements which serve the function of slaving the feed rate through the spindle speed so as to achieve a controlled thickness of chip removal using either SFM or RPM control of the spindle speed.

The following detailed description of FIG. 1 illustrating the overall system and interrelationship of the several subcircuits that comprise the three basic sections identified above, will provide an outline understanding of the overall system for more readily comprehending the detailed description of a preferred, form of the invention described hereinafter.

The overall SFM-RPM-chip thickness numerical contouring control operates automatically to control a lathe shown generally at 11. The lathe 11 comprises a machining element 12 for machining or cutting a workpiece or part and to be controlled by the overall control. For this purpose, an X axis feed mechanism 13 (or cross slide feed mechanism) and a Z axis feed mechanism 14 (or longitudinal slide feed mechanism) are provided for respectively controlling the relative position of a cutter tool tip on machining element 12 with respect to the workpiece or part being machined along a longitudinal Z axis and a transverse X axis in a conventional known manner. The feed mechanisms 13 and 14 comprise appropriate drive shafts and gearing which position the machining element 12 along the two mutually perpendicular coordinates. Machining element 12 includes the cutting tool itself and may comprise a turret for holding a number of tools, one of which selectively may be brought into working position at any given point in time. The machine tool 11 also comprises a rotating mechanism or spindle 10 to which the workpiece or part being machined is attached, and which rotates or turns the part at a desired spindle speed. The block 201 includes an electric spindle drive motor and the motor controller element conventionally used to drive or control the speed of the electric spindle drive motor. The spindle drive motor drives a gear train 202 having a selectable gear ratio for driving the spindle at different speeds. The selection of the gear ratio is controlled by the output of the numerical input data equipment 31.

A positioning servo loop is provided for each of the X and Z axis feed mechanisms and are structurally independent of each other in their action in driving their respective feed mechanisms, but are substantially identical in construction and operation. The X coordinate axis positioning servo loop is comprised by an X axis positioning servo amplifier and associated drive motor shown at 15 which drives the X axis feed mechanism 13. It also drives a feedback synchro-resolver 16 whose output supplies an electrical representation of the position of the X axis feed mechanism 13 back to an X axis position comparator or phase discriminator 18. The phase discriminator or comparator 18 operates to compare the actual position of the cutting tool 12 in the X coordinate as represented by the X axis position feedback signal supplied from resolver 16 with the commanded position supplied from an X axis position command phase counter 19, and to derive an error signal representative of any difference that is used in controlling servo 15.

The X axis position command phase counter 19 is controlled by the output of a function generator 22 whose output also is supplied directly over a path 23 to the input of the X axis command phase counter 19. X axis command phase counter 19 also is controlled by the output from an offset register 24 and by the output from a reference clock pulse train generator shown at 25 in the upper left-hand corner of FIG. 1 and supplied to X axis command phase counter 19 over the path 26. The pulse train generator 25 serves to develop a synchronizing pulse train that is supplied to all of the elements of the numerical contouring control in a well known manner for synchronizing the operation of all of the components of the control to a basic input clock pulse frequency. Because certain of the components will operate at different frequencies, pulse rate dividers such as shown at 27 and 28 are employed to divide down the basic clock frequency for use by the several components of the system as needed.

The function generator 22 basically serves to derive an input velocity command signal from the output of a velocity command circuit 29 that in turn is controlled by the output from the clock pulse rate frequency divider 27, and the output command data supplied from the input data equipment 31 for the numerical contouring control. The function generator 22 then operates to derive from the input velocity command signal two separate pulse trains for use in controlling separately the operation of the X axis positioning servo system and the Z axis positioning servo system. Because the Z axis positioning servo system is substantially identical in construction and operation to the X axis positioning servo system, the components comprising the z axis system have been given the same reference numerals as those of the X axis system, but have been primed. A further description of the components of the Z axis positioning servo system is believed unnecessary since they operate in the same manner as the correspondingly numbered components of the X axis positioning servo system. For a more detailed description of the construction and operation of the elements of the feed rate controlling section comprised by the X and Z axis positioning servo systems described briefly above, reference is made to any of the published literature on numerical contouring control systems such as U.S. Pat. No. 3,120,603 issued Feb. 4, 1964 to J. E. Jones for an automatic control apparatus and assigned to the General Electric Company.

The second basic main section of the overall SFM-RPM-chip thickness numerical contouring control shown in FIG. 1 is comprised in part by a spindle speed velocity command circuit shown at 41 which is controlled by the input data equipment 31 for the numerical contouring control, and serves to derive a spindle speed command pulse train that is synchronized with the reference clock pulse train supplied from clock pulse generator 25. The command spindle speed pulse train then is supplied through a suitable gain control circuit shown at 42 where it is converted from a pulse train to a corresponding DC analog control signal representative of spindle speed and supplied to the input of a variable gain amplifier 43. The output from the variable gain amplifier 43 then is supplied to control the speed variator or other control for the spindle drive motor in a conventional, well known manner. The gain controlling circuit 42 also includes portions that are controlled by the output of a radius counter or register 44 whose operation is controlled by the input data equipment of the numerical contouring control 31 and the change in X axis position (or radius) of a part being machined as depicted by the X axis command pulse train derived from the output of function generator 22 and supplied to the X axis distance counter 21 as well as to the radius register 44.

In operation, the change-in-radius speed control circuit comprised in part by the radius counter 44 functions in the following manner. The radius counter 44 operates to store the instantaneous actual radius since it is supplied from the output of the function generator 22 with pulses representative of the elementary displacement of the machining element 12 (and therefore the cutting tool) along the transverse X axis. The same pulse train is supplied to the control circuits which command the X axis feed positioning servomechanism. Since the X axis feed positioning servo system has a very fast response to a received command signal, the content of the radius counter 44 for most purposes can be considered at any time to be representative of the instantaneous actual value of the radius of the part being machined. The radius counter 44 supplies its output over a connection 45 to the gain controlling circuit 42 where it is converted by suitable digital to analog converter elements (as described hereinafter) that in turn control the gain of the variable gain amplifier 43. The output of amplifier 43 therefore will be changed according to changes in the cutting radius and drives the spindle motor in a manner to rotate the spindle at a speed related to the cutting radius so that the resultant surface feet per minute moved past the cutting tool (SFM) is kept constant.

The third and last main section of the SFM-RPM-chip thickness numerical contouring control is comprised by the chip thickness control elements. The chip thickness control elements in fact include and operate with the elements of the previously described feed rate operation controlling section and spindle speed operation controlling section, but interrelate the operation of these two sections so as to slave the feed rate $v$ to the angular speed of the spindle $w$ and to make the feed rate $v$ inversely proportional to the angular speed of the spindle $w$. For this purpose, a spindle speed encoder 51 is provided and is directly coupled to the spindle of the lathe for deriving a digitized pulse train representative of the angular speed $w$ of the spindle. This spindle speed pulse train then is supplied over a path 52 to the input of the velocity command circuit 29 for use in deriving the output feed rate command pulse train supplied to function generator 22 as will be described hereinafter.

Operating Process of SFM-RPM-Chip Thickness Numerical Contouring Control

In operation, the input to the overall numerical contouring control is supplied from the input data equipment 31 which accepts the numerical command data in punched tape, punched card, magnetic tape, or other similar input form. The input data equipment 31 reads the instructions and addresses on the input commands and then generates appropriate electrical signals synchronized with the reference clock pulse train from clock pulse generator 25 for controlling the various elements of the above three briefly described control sections. Typically, the numerically controlled input information is encoded in digital form related to the desired thickness of chip cut while the cutting element 12 is performing its contouring function, the desired surface machining rate (SFM) or the desired revolutions per minute (RPM), the X and Y axis departures, the extent of the cut, the direction of the cut, the rate at which the cut will be made, i.e., the feed rate of the cutting tool 12 relative to the workpiece or part being machined along both the X and Z axes, the arc center offset if a circular contour is to be generated, etc. The instructions from the input equipment 31 then are routed to the appropriate control sections in accordance with the programmed addresses.

If a controlled chip thickness mode of operation is commanded by the input data equipment 31, the overall numerical contouring control will be structured so that the velocity command pulse train supplied from the output of velocity command circuit 29 will be derived from the input spindle speed pulse train supplied from spindle speed encoder 51. In this manner, it will be assured that the resultant feed rate command pulse train for both the X and Z axis feed rate positioning servomechanism will be slaved to the spindle speed and will be proportional to the angular speed of the spindle $w$. Alternatively, if the overall numerical contouring control is structured by the input data equipment to operate in either the SFM or the RPM mode without chip thickness control, the output velocity command pulse train from 29 will be derived from the input reference clock pulse train and will not be so related to the spindle speed of the lathe.

Irrespective of how it is derived, the output velocity command pulse train from 29 consists of a train of pulses whose pulse rate is representative of a desired feed rate (i.e., velocity at which the feed mechanism will move the machining element cutter tool 12 into the workpiece or part being machined along the respective X and Z axes). The total number of pulses contained in the pulse train (which is monitored by the X and Z axis distance counters) will determine the total path covered by the cutter in a given machining operation. Where the velocity command pulse train is derived from the spindle speed pulse train, then the resultant feed rate controlling pulse trains derived therefrom by the function generator 22 will command a given amount of feed rate movement per spindle revolution so as to provide a desired or command value of chip thickness removal during each revolution of the spindle. For those materials being machined that require a constant thickness of chip removal for optimum machining performance, the velocity command circuit 29 will be programmed to command a constant number of pulses per spindle revolution where the constant number is representative of the desired constant chip thickness. The velocity command circuit 29 also performs additional functions of manual feed rate override and synchronization of the spindle speed pulse train with the reference clock pulse train from generator 25. The function generator 22 resolves the feed rate command signal supplied from velocity command circuit 29 into the two component pulse rates commensurate with the required velocities along the X and Z axes. The manner in which this is accomplished has been described in considerable detail in the literature such as the above referenced U.S. Pat. No. 3,120,603.

Under machining conditions where the numerical contouring control has been structured for an SFM control with or without chip thickness, the numerical input data equipment 31 will read into the radius counter 44, which is a reversible counter, a value representative of the initial radius of the part being machined. The input data equipment also supplies to the spindle velocity command 41 a value measured in terms of surface feet per minute representative of the command surface feet per minute to be moved past the cutter tool tip by the lathe spindle. The spindle velocity command then will derive a pulse train synchronized with the reference clock pulse train from generator 25 representative of the command value of SFM. This command SFM pulse train will then be supplied through the gain control circuit 42 which converts the pulse train to a corresponding DC analog control signal that is supplied to the variable gain amplifier 43. This command spindle speed pulse train and resultant corresponding DC analog spindle speed control signal measured in terms of SFM will vary from point to point in a given cutting operation in accordance with the preprogrammed value of SFM. Should the machining operation call for a constant SFM, then, of course, the repetition rate of the spindle velocity command pulse train appearing at the output of circuit 41 will be maintained constant at the command value for the constant SFM desired.

Concurrently with the operation of the spindle velocity command described briefly above, the radius counter 44 will have read into it the starting radius of the part being machined. Thereafter, during the machining operation, the radius counter 44 will be counted up or down by the pulses of the X axis positioning servo feed rate command pulse train which as stated previously correspond to the instantaneous actual value of the radius of the part being machined. The resultant radius count in counter 44 then is employed dynamically to vary the gain of amplifier 43 through the gain control circuit 42 so as to continuously, dynamically adjust the gain of this amplifier in inverse proportion to the absolute radius. In this manner, the resultant output signal from operational amplifier 43 will be corrected for changes in radius of the part being machined so as to in effect translate rotational speed of the spindle into corresponding surface speed moving past the cutter tool of the lathe.

It will be appreciated that the SFM operating mode may be employed with or without the chip thickness control feature described previously above and to be detailed more fully hereinafter. Further, if it is desired to structure the lathe numerical contouring control to operate in an RPM mode, then the command values for spindle speed supplied to the spindle velocity command circuit 41 will be programmed in values of revolutions per minute. With the control structured to operate in this mode, the radius counter 44 and associated elements of the gain control circuit 42 are disconnected, and an RPM fixed value gain control element is connected into circuit relationship with the variable gain amplifier 43 to allow the circuit to operate in accordance with command values of revolutions per minute for the spindle speed of the lathe. Here again, while operating in the RPM mode, the control may be structured to function with or without chip thickness control as described previously depending upon the requirements of a particular machining operation. The detailed construction of the overall SFM-RPM-chip thickness control described briefly above will be set forth more fully hereinafter.

Feed Rate Command Block

Figure 2:
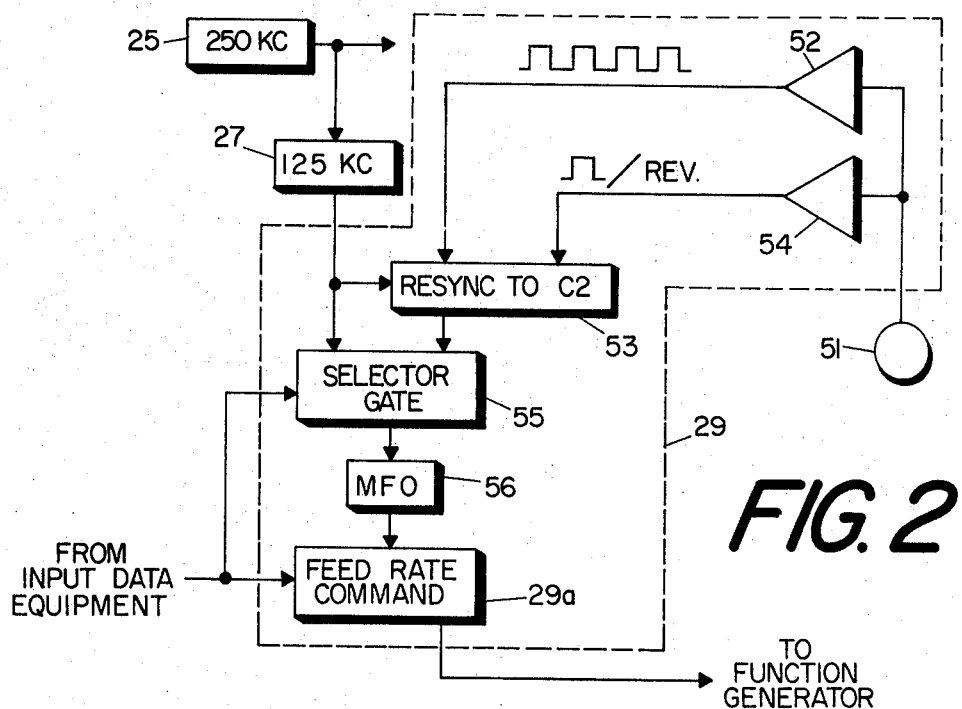
FIG. 2 is a functional block diagram of a part of the overall control shown in FIG. 1 that is employed selectively to operate the control either in a chip thickness control mode, or independently of chip thickness by selectively slaving the feed rate operation to the spindle speed.

FIG. 2 of the drawings if a functional block diagram of the construction of certain parts of the velocity command circuit 29 and shows the manner in which the control selectively can be made to respond either to the spindle speed pulse train derived from the spindle speed encoder 51, or alternatively to respond to the C2 reference clock pulse train derived from the output of divider 27 that in turn is supplied from the reference clock pulse train generator 25. The spindle speed encoder 51 is a digital tachometer device which includes optical elements geared directly to the spindle acting in conjunction with lamps shining through discs marked with etched lines for deriving predetermined numbers of pulses for each revolution of the spindle. An index point is provided to produce one pulse per revolution of the spindle while other tracks produce respectively 1,000; 5,000; 10,000 or other numbers of pulses per revolution. The pulses thus produced are amplified in a suitable amplifier shown at 52 and supplied to the input of a synchronize to C2 gating circuit shown at 53. The index pulse also is supplied to gating circuit 53. For a detailed description of a suitable digital spindle speed encoder that can be used for the device 51, reference is made to United States application Ser. No. 659,728 filed Aug. 10, 1967 — Automatic Position Inspector — J. F. Bakel et al., Inventor — and assigned to the General Electric Company.

The pulse train generated by the spindle speed encoder 51 is supplied to the synchronizing gate 53 for the purpose of synchronizing the spindle speed pulse train with the reference clock pulse train generated by the clock pulse generator 25. The output from the clock pulse generator 25 is supplied through a first pulse rate divider 27 which converts the input frequency of 250 kHz to an output symmetrical square wave signal having a frequency of 125 kHz, hereinafter referred to as the C2 clock. The C2 clock is fed to the synchronizing gate 53 to synchronize the spindle speed pulse train supplied from encoder 51 with the operation of the remaining parts of the equipment. Both the C2 clock pulse train and the output from the synchronizing gate 53 are supplied to the input of the selector gate whose output in turn is supplied to a manual feed override circuit 56 of conventional construction that in turn supplies the feed rate command circuits 29a. The construction and operation of the selector gate 55 will be described more fully hereinafter in connection with FIG. 3 of the drawings. For the purpose of the instant disclosure, it is sufficient to state that it selects either the C2 reference clock pulse train or the spindle speed pulse train to supply through the manual feed override circuit to control the operation of the feed rate command circuit 29a as described previously in connection with FIG. 1.

The manual feed override 56 comprises a variable rate multiplier which is manually settable to convert an input frequency pulse train to a lower output frequency pulse train. The purpose of the manual feed override 56 is to enable an operator of the equipment to change the feed rate programmed by the numerical data input equipment at some point during a machining operation should such change be desirable in the viewpoint of the operator. If no change is made by the operator, the input pulse train supplied from selector gate 55 goes through the manual feed override circuit 56 unchanged to the feed rate command circuit 29a. The feed rate command circuit 29a will then modify the input pulse train supplied thereto in accordance with the command values of feed rate called for by the input data equipment to provide at its output a feed rate command pulse train that then is supplied to the function generator. Further details about the construction and operation of the manual feed rate override 56 and the feed rate command circuit 29a which is comprised by working command storage counters, multiplication gates and multiplier counters is set forth in greater detail in the above referenced U. S. Pat. No. 3,120,603.

Figure 3:
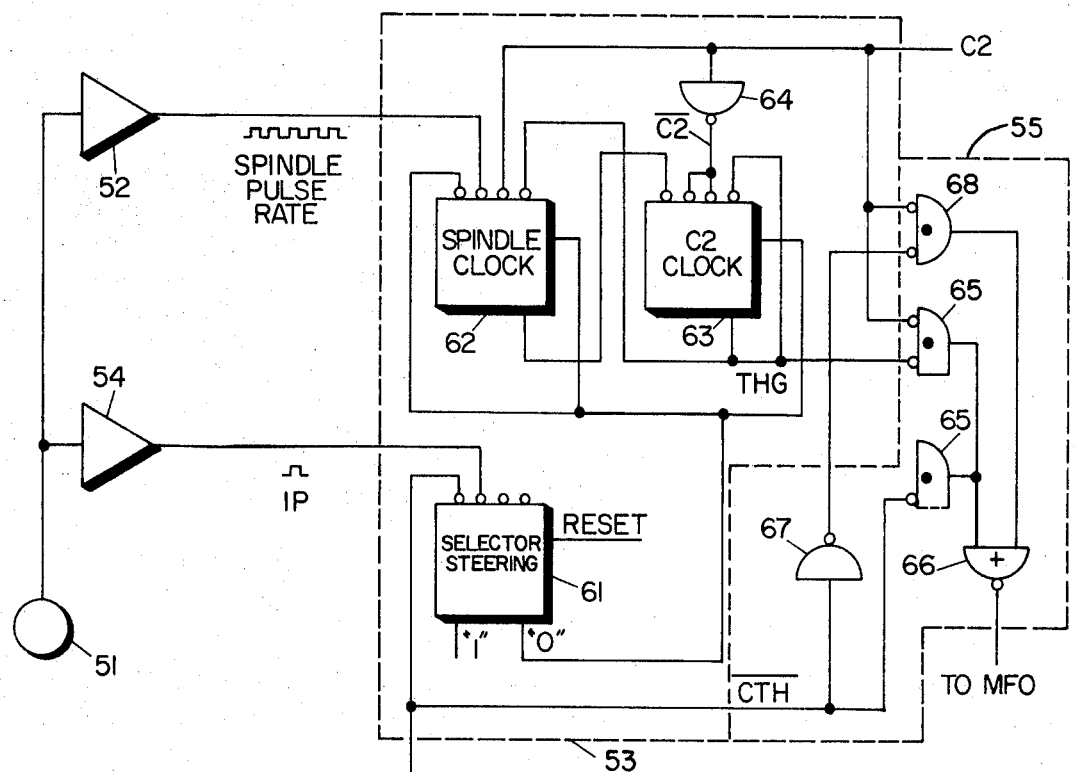
FIG. 3 is a detailed logical circuit diagram of a selector gate construction comprising a part of the control circuit portion shown in FIG. 2.

FIG. 3 is a detailed logical circuit diagram of the construction of the selector gate 55. The selector gate 55 includes a plurality of flip-flop circuits interconnected through appropriate NOR gates for selectively supplying at the output of selector gate 55 either the C2 clock pulse train or the spindle speed pulse train as determined by a command input from the input data equipment. The construction and operation of the flip-flop circuits, the NOR gates, and other reversible counters, buffer storage, multiplier counters, digital to analog converter elements and similar known circuit structures used in the numerical contouring control, and which are conventional, commercially available items are described more fully in the above referenced U. S. Pat. No. 3,120,603. Accordingly, reference is made to this patent for a more detailed description of the construction and operation of these devices. It is believed sufficient for the purpose of the present disclosure to point out that with respect to the NOR gate, these devices operate in accordance with the following truth table which can be interpreted in conjunction with the adjacent sketches indicating the output signal in the form of a binary logic level that will be obtained for a given combination of inputs.

NOR LOGIC TABLE

| A | B | C |
|---|---|---|
| 0 | 0 | 1 |
| 0 | 1 | 0 |
| 1 | 0 | 0 |
| 1 | 1 | 0 |

A—◯⟍
B—◯⟋ —C   Used in AND sense

A—⟍
B—⟋+ ◯—C   Used in OR sense

This truth table is applicable to multiple input gates. With respect to the flip-flops, multiplier counters, reversible counters, and the like, described hereinafter, these devices utilize steering input terminals, and the potential of the steering input terminal must go from a logic one "1" level to a logic zero "0" level to set, reset or change count in advance of a trigger signal. Thereafter, the trigger input terminal must go from a logic one to a logic zero level to set, reset or change the count. There must be a finite time interval, if only of extremely short duration, between the change in steering input terminal signal level and the change in trigger input signal level for the trigger action to occur, and thereby cause the flip-flop to change state or the counter to change count. In addition, both the flip-flop and the counters possess electronic set and electronic reset input terminals whereby the flip-flops or the counters (which are comprised by a series of interconnected flip-flops) may be set or reset to a given state by the application of an appropriate logic level input signal. The particular logic circuit structures employed in fabricating the embodiment of the invention described herein use the construction of a logic "1" level being represented by a potential of −6 volts and a logic "0" being represented by a zero volt potential. For the logic level assignments just given, the gate circuit utilized performs a NOR logic function. If just one gate input is used, the NOR gate performs an INVERTER logic function. As a crutch to aid the human mind, the basic NOR gate is illustrated in the diagrams with three different symbols to represent use of the same circuit in the "inverter", the "and", and the "or" sense. Thus, the "and" type symbols perform a logic inversion of each input followed by an "and" logic operation. The "or" type symbol performs an "or" logic operation followed by a logic inversion. In each case, this corresponds identically to the NOR logic function illustrated in the logic table. This is in accordance with well known techniques described in such texts as the reference book entitled "Logical Design of Digital Computers" by Montgomery Phister, Jr., published by John Wiley and Sons, Inc. Library of Congress Catalog Card No. 58-6082.

The selector gate 55 shown in FIG. 3 is comprised by a selector steering flip-flop 61 having its set trigger input terminal supplied with the one pulse per revolution index pulse appearing at the output of amplifier 54 and supplied from spindle speed encoder 51. The set steering input terminal of selector steering flip-flop 61 is supplied with a $\overline{CTH}$ enabling signal provided from the input data equipment and whose presence or absence indicates whether or not the control is to be structured to operate in a chip thickness control mode. If the $\overline{CTH}$ signal is present, it will be at a one level. Upon the numerical control being structured to operate in a chip thickness mode, $\overline{CTH}$ goes to zero, thereby enabling selector steering flip-flop 61 to be set upon the occurrence of the next one pulse per revolution index trigger pulse being supplied from spindle speed encoder 51.

Selector steering flip-flop 61 has its reset output terminal connected to the electronic reset input terminal of a spindle clock flip-flop 62 and a C2 cock flip-flop 63, as well as being connected directly to the set steering input terminal of the spindle clock flip-flop 62. The set trigger input terminal of spindle clock flip-flop 62 is connected to the output from amplifier 52 that has supplied to it the spindle speed pulse train derived by spindle speed encoder 51. The reset trigger input terminal of spindle clock flip-flop 62 is connected directly to the C2 reference clock pulse train input supplied from clock pulse generator 25 through divider 27 as shown in FIG. 2. The reset output terminal of spindle clock flip-flop 62 is connected to the set steering input terminal of the C2 clock flip-flop 63, and the reset output terminal of C2 clock flip-flop 63 is connected to the reset steering input terminal of spindle clock flip-flop 62. The reset steering output terminal of flip-flop 63 also is connected directly back to its reset steering input terminal and the two trigger input terminals of C2 clock flip-flops are connected through an inverter 64 to the input C2 reference clock pulse train.

By reason of the above interconnections, the flip-flops 61 through 63 will function in the following manner. Upon the occurrence of the one pulse per revolution index pulse supplied to the trigger input terminal of selector steering flip-flop 61 with the chip thickness control signal $\overline{CTH}$ having gone from one to zero in the previously described fashion, will result in setting selector steering flip-flop 61. This results in the reset output terminal of 61 going from a logic one to a logic zero level and operates to enable the set steering input terminal of spindle clock flip-flop 62 after resetting both spindle clock flip-flop 62 and C2 clock flip-flop 63 to their reset state through their reset electronic input terminals. As a consequence, flip-flop 62 will be enabled to clock through the spindle speed pulse train supplied from encoder 51 through amplifier 52 at the spindle speed pulse train rate, and this spindle speed pulse train will appear at the reset output terminal of spindle clock flip-flop 62 and will be applied to the set steering input terminal of the C2 clock flip-flop 63. After being thus enabled, the inverted C2 clock pulse $\overline{C2}$ will then trigger the C2 clock flip-flop and the spindle clock flip-flop 62 between its set and reset output state at the C2 clock rate but with the number of pulses produced in the pulse train being determined by the spindle speed pulse train. This results in producing an output THG chip thickness control pulse train at the output terminals of the C2 clock flip-flop 63.

The output chip thickness control pulse train THG appearing at the reset output terminal of C2 clock flip-flop 63 is supplied to one of the input terminals of a NOR gate 65 having its remaining input terminals supplied directly to the C2 clock pulse train and with the $\overline{CTH}$ chip thickness control enabling signal supplied from the input data equipment of the numerical control. The presence of these signals at NOR gate 65 will allow gate 65 to gate through the THG chip thickness control pulse train to one input terminal of a NOR gate 66 that supplies its output to the manual feed override 56 shown in FIG. 2. The $\overline{CTH}$ chip thickness control enabling signal from the input data equipment is also supplied through an inverter 67 to one of the input terminals of a second NOR gate 68 having its remaining input terminal supplied directly with the C2 reference clock pulse train. As a consequence of this arrangement, it will be seen that where the numerical control is structured to operate in a normal manner rather than using chip thickness control, the inverter inverts the $\overline{CTH}$ signal to enable NOR gate 68 to gate through the C2 clock pulse train directly through NOR gate 66 to the manual feed override without modification. Accordingly, it will be appreciated that depending upon the presence or absence of the $\overline{CTH}$ signal a THG chip thickness control pulse train will be supplied at the output of NOR gate 66 which is slaved to the spindle speed of the lathe, or alternatively the C2 reference clock pulse train will be supplied directly through the circuit without modification.

SFM Control Section

Figure 4:
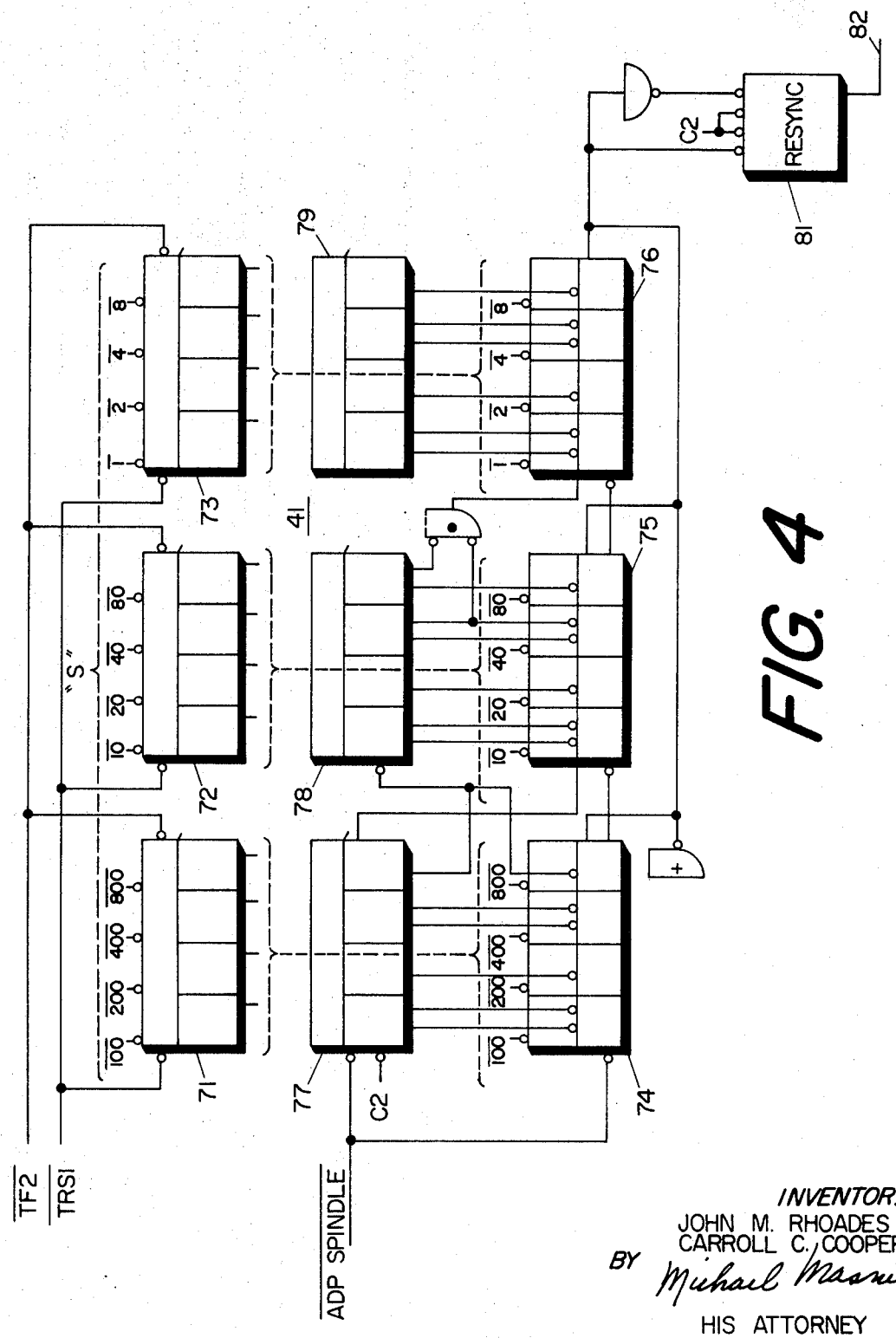
FIG. 4 is a functional block diagram of a spindle speed command multiplier counter used in practicing the invention.

FIG. 4 of the drawings is a functional, logical block diagram of a spindle speed command pulse rate multiplier that forms the spindle speed velocity command block 41 shown in FIG. 1 of the drawings. The spindle speed command multiplier counter 41 is comprised by a series of three interconnected buffer storage units 71, 72, and 73 which are interconnected in a one, two, four, eight code arrangement to store command values of spindle speed registered in terms of either surface feet per minute or in terms of revolutions per minute determined by which mode of machining operation is desired. The buffer storage units 71–73 receive the count stored therein directly from the input data equipment and operate to provide enabling output potentials to corresponding input terminals of a set of three multiplier gates 74–76 which have a second set of input terminals interconnected with the output terminals of a set of multiplier counters 77–79 to form a conventional multiplier counter. For a more detailed description of the construction and operation of a multiplier counter such as that shown in FIG. 4, reference is made to the above-identified U.S. Pat. No. 3,120,603.

For the purpose of the present disclosure, it is believed sufficient to point out that the count stored in the working buffer storage units 71–73 enables the multiplier gates 74–76 to gate through a number of input reference clock pulses supplied to the multiplier counters 77–79 in accordance with the count registered in the buffer storage units 71–73. It does not matter whether this count represents surface feet per minute units or revolutions per minute units since the only difference between the two would be that an output pulse and the resultant output pulse train appearing on the output summation line of multiplier gates 74–76 would represent either an incremental value of surface feet per minute moving past the cutter tool tip or alternatively an incremental value of angular distance rotated by the spindle shaft. The particular spindle speed command multiplier counter 41 shown in FIG. 4 is designed to be used with an adaptive numerical control described and claimed in copending United Stated States application Ser. No. 852,435, now abandoned, (General Electric patent docket 45-NU-Q1059 — John M. Rhoades Inventor — entitled "Adaptive Numerical Control for Lathes") — filed concurrently with this application and assigned to the General Electric Company.

If used with an adaptive numerical control, an adaptively modified input spindle speed controlling pulse train is supplied to the multiplier counters 77–79 and is identified as an $\overline{\text{ADP SPINDLE}}$ pulse train. With such an arrangement, the spindle speed command multiplier counter 41 will then operate to further modify the pulse train by multiplying in the command value of spindle speed either in terms of surface feet per minute or revolutions per minute as discussed above, and to supply the output that appears on the output summation lines of the multiplier gate 74–76 to a resync flip-flop 81 that serves to resynchronize the pulse train with the C2 clock of the numerical control system. Alternatively, a fixed repetition rate input pulse train which has been divided down from the clock reference frequency of the pulse generator 25 can be supplied as the input pulse train in place of the $\overline{\text{ADP SPINDLE}}$ pulse train for controlling operation of the multiplier counters 77–79. With either arrangement, an output spindle speed command pulse train is produced at the reset output terminal of resync flip-flop 81 whose repetition rate will be representative of the command value of spindle speed measured in either terms of surface feet per minute or revolutions per minute depending upon which operating mode the numerical control system has been structured to operate in by the input data equipment.

Figure 5:
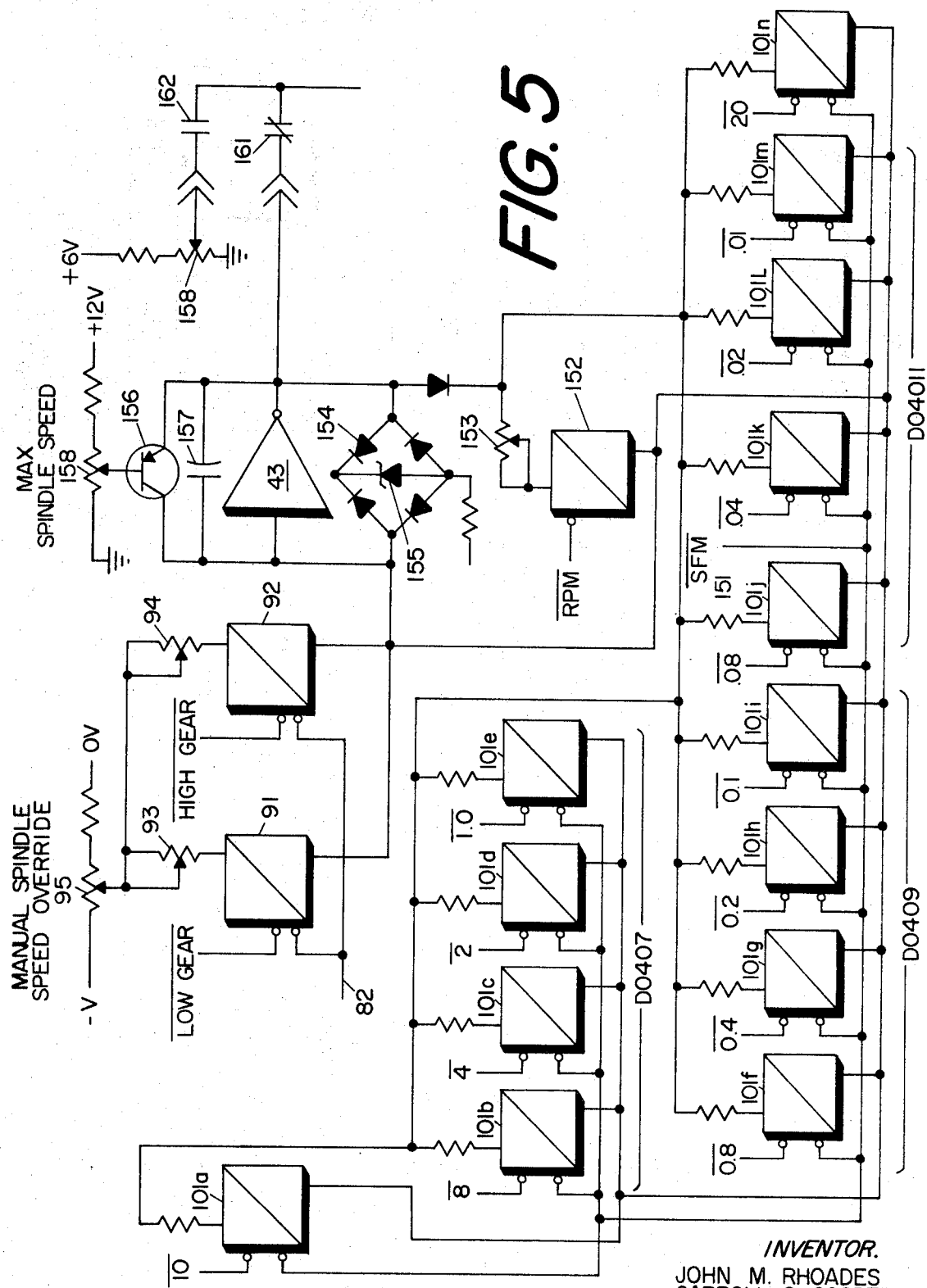
FIG. 5 is a detailed logical circuit diagram showing the construction of the heart of the SFM-RPM-Chip Thickness control utilizing a variable gain amplifier, and comprising many of the novel features of the overall numerical control shown in block diagram form in FIG. 1.

The command spindle speed pulse train appearing at the reset output terminal of resync flip-flop 81 in FIG. 4 is supplied over an output path 82 to a correspondingly numbered input terminal 82 in FIG. 5 to the input terminals of a pair of digital to analog converters 91 and 92 connected to the summing input terminal of the variable gain amplifier 43 which is a conventional commercially available operational amplifier. The digital to analog converter elements 91 and 92 are conventional, commercially available elements and have been described in the published literatures such as U. S. Pat. No. 3,120,603. Either one or the other of the digital to analog converter elements 91 or 92 will be connected in circuit relationship with the summing operational amplifier 43 by means of a command $\overline{\text{LOW GEAR}}$ or command $\overline{\text{HIGH GEAR}}$ enabling potential supplied to one of the input terminals of the digital to analog converter element along with the command spindle speed pulse train. These enabling potentials are representative of a selected one of a plurality of speed range changing gear ratios of a gear train that is employed to drive the lathe spindle, and that in turn is driven by the spindle drive motor controlled by the output from the summing operational amplifier 43. The selection of the low gear or high gear digital to analog converter normally is accomplished by the input data equipment upon initially structuring the numerical contouring control prior to performing a given machining operation.

To accomplish the speed range changing function, the digital to analog converters 91 and 92 serve to selectively connect in either one or the other of an input resistor 93 or 94 to the input of operational amplifier 43 and thereby variably adjust the gain of the amplifier in accordance with the resistance value of the input resistor 93 or 94. These values are, of course, chosen to reflect a particular speed range gear ratio and thereby serve to variably adjust the gain of operational amplifier 43 in accordance with a selected speed range gear ratio value. The end of the resistors 93, 94 not connected to its associated digital to analog converter element is connected in common to a manual spindle speed override potentiometer 95 for allowing manual override control of the spindle speed of the lathe.

Under machining conditions where the numerical contouring control is structured to perform a controlled SFM machining operation, the summing operational amplifier 43 will include in its feedback path a plurality of selectively operable digital to analog converter elements 101a–101n. The digital to analog converter elements 101a–101n are similar in construction to the digital to analog converter element described in U.S. Pat. No. 3,120,603 as well as D to A elements 91 and 92. Upon structuring the numerical contouring control for operation in the SFM mode, the input data equipment will supply an $\overline{\text{SFM}}$ enabling signal to the D to A elements 101a–101n which renders all of the elements susceptible to being connected in circuit relationship in the feedback path of summing operational amplifier 43. The remaining input terminals of the D to A elements 101a–101n are connected to the respective output terminal of a six-decade radius counter shown in FIG. 6 of the drawings.

Figure 6:
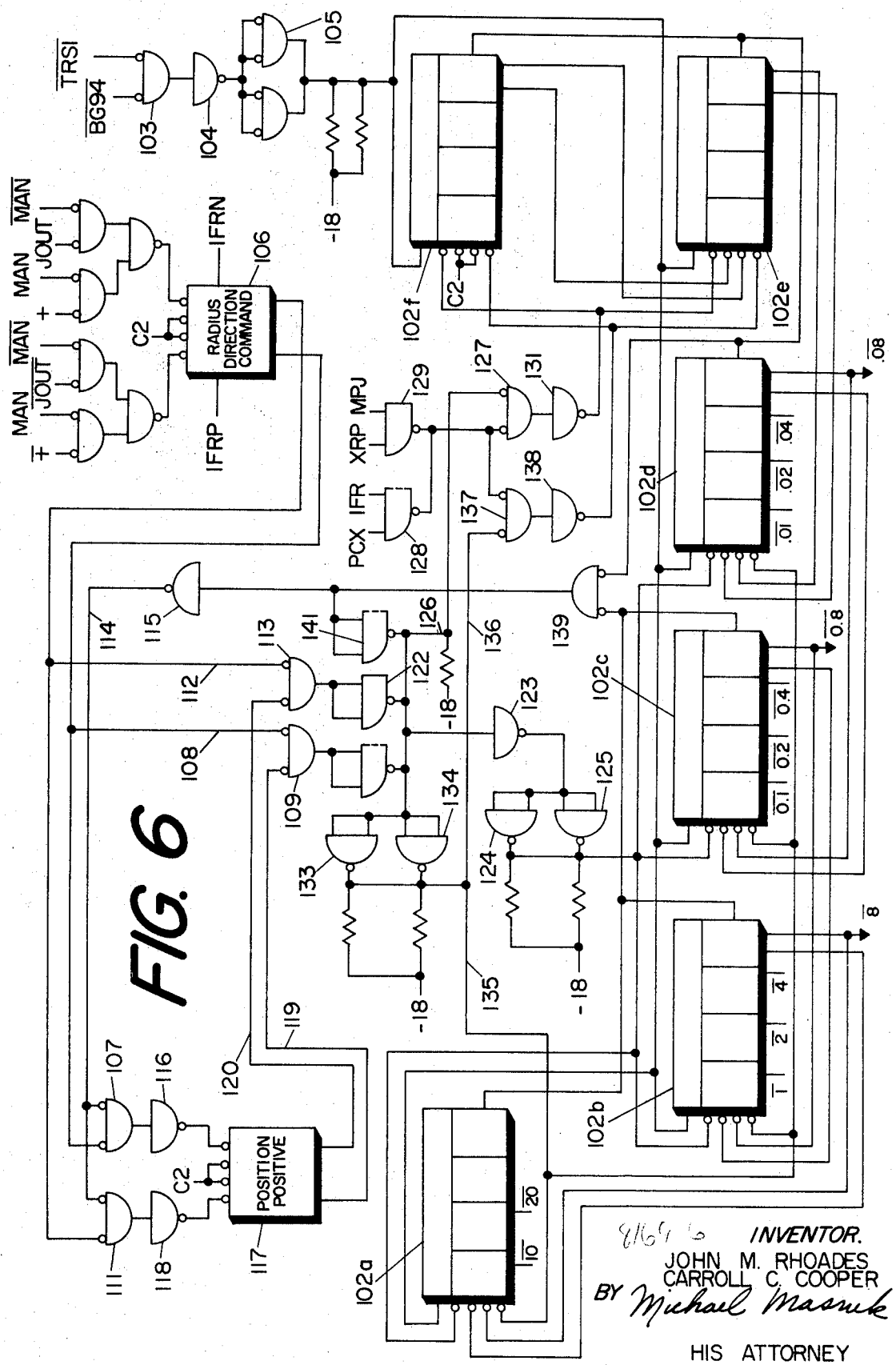
FIG. 6 is a detailed logical circuit diagram of an absolute X position radius counter used with the control circuit arrangement shown in FIG. 5 of the drawings.

FIG. 6 of the drawings is a detailed logical circuit diagram of the construction of the absolute "X" position radius counter that is used selectively to control the settings of the various digital to analog converter elements 101a–101n shown in FIG. 5. The radius counter comprises essentially a six-decade reversible counter formed by conventional reversible counter units 102a–102f interconnected in a one, two, four, eight code arrangement and capable of storing values of radius in units from 0.0001 inch to tens of inches. The reversible counter unit 102a stores values in units of tens of inches and the reversible counter 102f stores values in units of ten thousandths of an inch with the intermediate reversible counter 102b–102e storing values in terms of units, tenths, hundredths and thousandths of an inch. For a more detailed description of the construction and operation of the absolute radius position reversible counter, reference is made to the above-identified U. S. Pat. No. 3,120,603 and in particular to FIG. 13 and the description relating thereto.

The absolute radius position is initially reset to a zero value defined by the center line of the spindle of the lathe by means of an input NOR gate 103 having its input terminals supplied with a BG94 and a TRSI enabling signal supplied from the input data equipment. The output from NOR gate 103 is then supplied through an inverter 104 and extended NOR gate 105 whose output is connected across a pair of parallel connected 1.3K resistors to a source of −18 volts and is connected directly to the electronic reset input terminals of all of the reversible counters 102a–102f. With this arrangement, upon initially setting up the numerical contouring control system to control a particular machining operation, the input data equipment can precondition the radius reversible counters 102a–102f by resetting it to zero prior to storing a count in the counter which is representative of the initial radius of the part being machined. The extended NOR gates 105 provide a suitable impedance match and sufficient power to drive all of the reversible counter units 102a–102f in parallel.

Control of the counting direction of the reversible counters 102a–102f is achieved by means of a radius direction command flip-flop 106 which when operated in its set state causes the reversible counters to be counted in the positive direction, and when in its reset state causes the counters to be counted in the negative direction. Direction controlling incremental feed signals IFRP and IFRN are supplied from the input data equipment to the electronic set and reset input terminals of flip-flop 106 for controlling the state of operation of the radius direction command flip-flop 106 on incremental feed.

The radius direction command flip-flop 106 has its set output terminal connected directly to one input terminal of a NOR gate 107 and through a path 108 to an input terminal of a NOR gate 109. Similarly, the reset output terminal of radius direction command flip-flop 106 is connected to one input terminal of a NOR gate 111 and over a conductor 112 to an input terminal of a NOR gate 113. The remaining input terminals of the NOR gates 107 and 111 are connected in common over a conductor 114 to the output of an inverter 115 for a purpose which will be described more fully hereinafter. However, for the purpose of the present disclosure, it can be stated that inverter 115 will produce a zero level enabling output potential whenever the count in the reversible counter goes through zero value. As a consequence, one of the input terminals of each of the NOR gates 107 will be supplied with an enabling zero logic level potential. Upon the radius direction command flip-flop 106 being set by the presence of the IFRP command signal, NOR gate 111 will produce a logic one level output signal that is inverted by inverter 118 and causes flip-flop 117 to be set upon the next C2 trigger pulse. This results in producing a level one enabling potential at the set output terminal of flip-flop 117 and a level zero output enabling potential at the reset output terminal. These potentials are supplied over the paths 119 and 120, respectively, to the remaining input terminal of the respective NOR gates 109 and 113. By examination, it will be seen that the presence of two "0" level enabling potentials at the input terminals of NOR gate 113 results in the production of a logic one level signal in its output that is inverted by a NOR gate 122. The logic zero level signal appearing at the output of NOR gate 122 is again inverted by a second inverter 123 and applied to the input terminals of a pair of extended NOR gates 124 and 125. The logic zero level enabling potential appearing at the output of the extended NOR gates 124 and 125 is then supplied to the up-count steering input terminals of all of the reversible counters 102a–102d in parallel to thus enable these counters to be counted in the up or positive direction relative to the zero count. The extended NOR gates 124 and 125 together with the network of biasing resistors connected in their output to the up-count steering input terminals of reversible counters 102a–102d provide sufficient output power to drive all of these reversible counters in parallel.

Concurrently with the above-described action, the zero level logic signal appearing at the output of NOR gate 122 is supplied over a conductor 126 to one of the input terminals of a NOR gate 127 having its remaining input terminal connected to the output of a pair of extended NOR gates 128 and 129. The NOR gate 128 and 129 in turn has its input terminals connected respectively to a PCX normal automatic control feed rate pulse train signal supplied from the numerical control, an IFR-incremental feed rate pulse train signal likewise supplied from the numerical control, an XPR-radius preset feed rate pulse train signal supplied from the numerical control and an MPJ manual control feed rate pulse train signal supplied from the numerical control. In the presence of any of these operating mode command pulsed signals supplied from the numerical control a zero logic level enabling potential will be supplied to the remaining input terminal of NOR gate 127 to produce at its output a logic one level signal that is inverted by an inverter 131 and supplied to the up-count steering input terminals of the two least significant reversible counter stages 102e and 102f.

In the above manner, it will be seen that the reversible counters 102a–102f will be conditioned for an up-count upon the next occurring C2 clock pulse supplied to the trigger input terminal of the least significant counter stage 102f. The down-count capability of the absolute radius position counter shown in FIG. 6 operates in substantially the same fashion as that traced through above for the up-count capability with the notable exception that in counting down the reversible counters 102a–102d are enabled in the downcount direction by a pair of extended NOR gates 133 and 134 whose output is supplied over a conductor 135 to the down-count steering input terminals of the reversible counter stages 102a–102d and is supplied over a conductor 136 through a NOR gate 137 and inverter 138 to the down-count steering input terminals of the reversible counter stages 102f and 102e. It should be noted, however, that the inclusion of a NOR gate 141 connected between the output of gate 139 and conductor 126 prevents the radius from ever being counted below zero value but always causes it to be counted in the up-direction after passing through zero. In this manner, the counter is prevented from "rolling over" after passing through zero, and registering a negative count.

During operation, all of the reversible counter stages 102a–102f are initially set to zero by the input command signals $\overline{BG94}$ and $\overline{TRSI}$ supplied from the input data equipment. Upon achieving the zero count condition where zero count in the counter corresponds to the center line of the spindle of the lathe, a level one output logic signal will appear at the output of a NOR gate 139 having its input terminal connected to the zero count output terminals of the reversible counter stages 102a–102d and 102f and 102e, respectively. Upon achieving the zero count condition, the output of NOR gate 129 will go to a logic one signal level that in turn produces a logic zero signal level at the output of the inverter 115 as mentioned previously. Thereafter, the input data equipment will command the counter to be counted up to a value corresponding to the initial radius value of the workpiece or part being machined. This normally will require the presence of an IFRP signal supplied to radius direction command flip-flop 106 causing this flip-flop to set as described in the above manner, thereby enabling the up-count steering input terminals of all the reversible counter stages 102a–102f as described previously. With the reversible counter thus conditioned, a command radius value input enabling potential (XRP) will be supplied to the extended input NOR gate 128 from the input data equipment to enable NOR gate 127 to allow the reversible counter stages 102a–102f to be counted up to a value corresponding to the initial radius of the workpiece. With any count thus stored in the radius counter, the output from the NOR gate 139 automatically will go from a logic one level to a logic zero level due to the fact that one of its inputs must go to a logic one level by reason of the count present in at least one of the reversible counter stages. This results in causing NOR gate 141 connected to the output of NOR gate 139 to change its output from a logic zero level to a logic one level. This results in removing the forced up-count direction to the reversible counter stages and places them solely under the direction of the radius direction command flip-flop 106 and register position polarity flip-flop 117. Since the IFRP signal is present commanding an up-count, the reversible counter will continue to be counted up by the XRP present count input signal until the initial radius value is stored in the register, despite the change in the output of NOR gate 141. Thereafter upon initiating a cutting operation, the IFRN, +, or JOUT command will be supplied to radius direction command flip-flop 106 to cause it to set the reversible counter stages to be counted down in a similar fashion to that described for the up-count steering operation.

The above action results in converting the signal supplied to inverter 123 from a logic zero to a logic one level and in turn converts the input to the extended NOR gates 124 and 125 from a logic one to a logic zero level signal and produces at the output of extended NOR gates 124 and 125 a logic one level signal thereby disenabling the up-count steering of the reversible counter stages 102a–102d. Concurrently, a logic one level enabling potential is supplied to the extended NOR gate 134 to produce at the output thereof a logic zero level enabling potential that is supplied over conductor 135 to the down-count input steering terminals of all of the reversible counter stages 102a–inverter d. This logic zero level enabling potential is also supplied over conductor 136 to NOR gate 137 thereby allowing this NOR gate to apply an input down-count steering enabling signal to the down-count steering input terminals of the reversible counter stages 102e and 102f. As stated earlier, the inputs to the extended NOR gates 128 and 129 are supplied from the X coordinate axis output pulse train derived in the function generator and will appear normally as the PCX pulse train. This pulse train is supplied through NOR gate 128, NOR gate 137 and inverter 138 to count down the reversible counter stages 102a–102f as the radius of the part being machined changes during a machining operation. This same down-count will occur if the machine is operated in a manual mode or an incremental feed mode and the countdown signals MPJ and IFR are employed to count down the radius register. As a consequence, the count appearing in the reversible counter stages 102a–102f at any given instant of time will represent the actual instantaneous radius value of the workpiece or part being machined.

Referring again to FIG. 5 of the drawings, it will be seen that the various counter stages of the parts radius position counter shown in FIG. 6 will produce on the count indicating output terminals thereof an electric signal representative of the count appearing in the reversible counter stages 102a–102f. The respective reversible counter stages are connected to respective ones of the digital to analog converter elements 101a–101n. By reason of this interconnection, as will be explained more fully hereinafter in connection with FIG. 7 of the drawings, the presence or absence of a count signal applied to one of the respective input terminals such as $\overline{10}$, $\overline{8}$, $\overline{-0.2}$, $\overline{0.1}$–$\overline{.02}$ and $\overline{.01}$ input signals will selectively enable the digital to analog converters to connect in various values of resistors in the feedback path of the variable gain operational amplifier 43 to proportionally adjust the gain of the amplifier directly in accordance with the changes in radius of the part being machined. In addition to the radius value signal input, each of the digital to analog converter elements 101a–101n has a remaining input terminal connected through a conductor 151 to an $\overline{SFM}$ enabling potential supplied from the input data equipment of the numerical control system for structuring the overall control to operate in an SFM mode. In this mode, the radius counter of FIG. 6 and associated digital to analog converter elements 101a–101n are enabled to change the gain of operational amplifier 43 in accordance with changes in radius of the part being machined, and to provide an output signal from the operational amplifier 43 that is related to surface feet per minute of the part being machined moving past the lathe cutter tool tip.

In addition to the SFM digital to analog converter array 101a-101n, operational amplifier 43 includes an RPM digital to analog converter 152 connected in series circuit relationship with a feedback gain changing resistor 153 across the input and output terminals of the amplifier in the feedback path thereof. The digital to analog converter 152 has an $\overline{\text{RPM}}$ enabling signal supplied thereto from the input data equipment of the numerical control system for selectively enabling converter 52 under conditions where the numerical control system is to be structured to operate in an RPM mode. When thus structured, the digital to analog converter 152 connects resistor 153 in the feedback path of operational amplifier 43 to thereby set the gain of the operational amplifier at some fixed value proportioned to the speed range of the spindle motor in each of the speed range gear ratios previously mentioned. As a consequence, with the fixed gain setting RPM resistor 153 connected in its feedback path, the output signal from operational amplifier 43 will be controlled only by variations in the value of the input signal supplied from the speed range changing digital to analog converters 91 and 92, and this in turn will be controlled by the value of the RPM spindle speed pulse train supplied from the spindle speed command counter 41 in terms of revolutions per minute.

In addition to the above gain setting digital to analog converter elements, operational amplifier 43 includes a clamping circuit comprised by a diode bridge 154 connected across its feedback path and including a zener diode 155 whose value will establish the maximum voltage that will be allowed at the output of the operational amplifier 43. This clamp in effect will establish the maximum speed limit of the spindle drive motor. In addition to the feedback clamp 154, 155, a variable maximum spindle speed control is provided in the form of a PNP junction transistor 156 having its emitter-collector connected across the feedback path of operational amplifier 43 in parallel with a filter capacitor 157. The base of transistor 156 is connected to the variable contact point of a maximum spindle speed potentiometer 158 whose setting adjustably controls the value of maximum spindle speed at some limiting value less than that established by the diode clamp 154, 155. The output from variable gain operational amplifier 43 is supplied through the normally closed contacts 161 of a manual control relay (not shown) to the spindle drive motor controller (not shown). The manual control relay also includes normally open contacts 162 that connect the output from a manual control potentiometer 163 to control the spindle drive motor controller in place of the output from operational amplifier 43. By reason of this arrangement, an operator of the equipment can bypass completely the numerical control system and take over and manually control operation of the spindle drive motor directly with the potentiometer 163.

Figure 7:
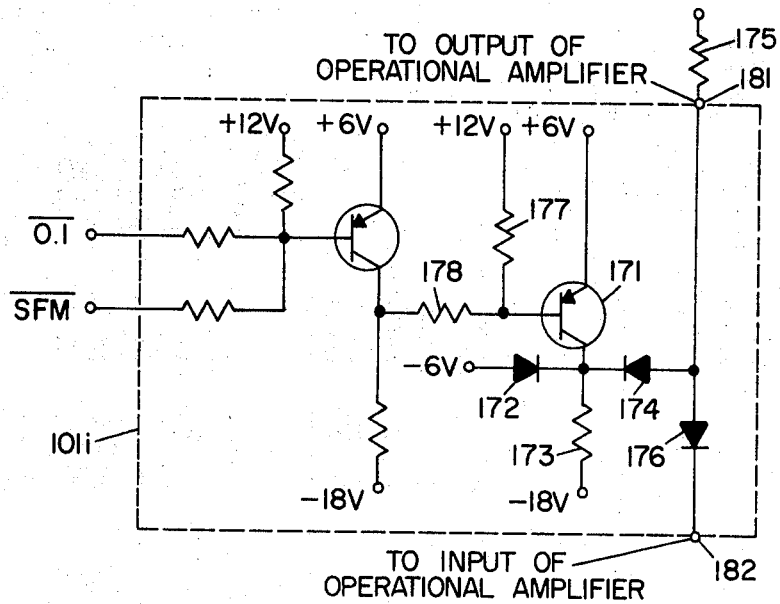
FIG. 7 is a detailed circuit diagram of the construction of one of the digital to analog converter elements used in the control circuit arrangement shown in FIG. 5 of the drawings.

FIG. 7 is a schematic circuit diagram of the construction of one of the digital to analog converter elements, for example, 101i, and illustrates the manner in which all the digital to analog converter elements 101a–101n and 152 operate to effect changes in the gain of the variable gain operational amplifier 43. The heart of the digital to analog converter element 101i is comprised by a PNP junction transistor 171 having its emitter connected directly to a +6 volt potential source and its collector connected through a clamping diode 172 to a −6 volt potential source. The collector of transistor 171 is also connected through a biasing resistor 173 to a −18 volt potential source and is connected through a coupling-blocking diode 174 to the juncture of a resistor 175 and a blocking diode 176 which in turn are connected in series circuit relationship in the feedback path of the variable gain operational amplifier. The base of transistor 171 is connected through a biasing resistor 177 to a +12 volt potential source, through a coupling resistor 178 to a NOR gate input transistor 179 whose inputs are connected to the $\overline{0.1}$ enabling potential and to the $\overline{\text{SFM}}$ enabling signal terminal.

The function of the digital to analog converter element 101i is to switch on and off a positive current path flowing through the resistor 175 by connecting or effecting a connection of an input terminal 181 to an output terminal 182. For correct operation of the D to A element, it is required that the potential of the output terminal 182 be about 0 volt and a positive voltage of any value (positive with reference to the output 0 volt value) must be applied to the input terminal 181 through the resistor 175 which for example, may comprise any of the resistors such as the 400K feedback resistance value gain establishing resistance used to vary the gain of operational amplifier 43 by any of the several digital to analog converter elements. This resistance value can be chosen over a wide range according to external requirements to appropriately change the gain of operational amplifier 43 in accordance with the changes in radius of the part being machined.

With the above arrangement, when a logic one level signal (which corresponds to 0 volts) is present at either the $\overline{0.1}$ or $\overline{\text{SFM}}$ input terminals, the base of transistor 171 will be held at a voltage which is sufficiently positive relative to the emitter voltage to prevent its conduction. As a consequence, the collector voltage of transistor 171 will be held at a value equal to or lesser than −6 volts by the diode 172 and resistor 173. Thus, a current will flow from the input terminal 181 through diode 174 and will back bias diode 176 sufficiently to prevent conduction through to the output terminal 182. When both control inputs are at a logic zero level (i.e., +6 volts) the base of transistor 171 will be driven sufficiently negative to allow transistor 171 to conduct. As a consequence, the collector of transistor 171 will rise to the +6 volt potential causing diode 174 to block, and rendering diode 176 conductive. It will be appreciated, therefore, that the presence of only one of the control inputs is not sufficient to cause the digital to analog converter element 101 to switch the resistor 175 into the main feedback gain controlling circuit. However, in the presence of both controlling input signals, the resistor 175 will be connected in the feedback circuit, thereby variably controlling the value of the gain of the operational amplifier.

Again referring to FIG. 5 of the drawings, it will be seen that the gain of operational amplifier 43 is controlled not only by the digital to analog converter elements 101a–101n or 152, connected in its feedback path, but also by the elements 91 and 92 connected in its input circuit. If the lathe spindle is driven by the spindle drive motor through different sets of speed range changing gear trains having different transmission ratios, it is necessary to account for these changes in speed range. It is assumed that only two transmission ratios are provided, however, it is believe apparent that even more can be accommodated. Further, if the spindle drive motor drives the lathe spindle directly or through a single gear train only a single D to A element such as 91 needs to be provided since there will be no need to change the gain of the operational amplifier to accommodate for different speed range changing gear ratios. However, assuming that two speed transmission ratios are provided, then the D to A elements 91 and 92 are used selectively to change the input resistance of operational amplifier 43 by selectively connecting in either the resistor 93 or resistor 94 as described above in its input circuit. The values of the resistors 93 and 94 will, of course, depend upon the speed range changing gear transmission ratios.

During operation, the variable pulse rate command spindle speed pulse train supplied from the spindle speed command counter 41 through resync flip-flop 81 and terminals 82 is selectively fed to the input of operational amplifier 43 with a current pulse rate which depends in amplitude on which one of the D to A elements 91 or 92 and its corresponding resistor 93 or 95 is connected in the input circuit of operational amplifier 43. Since the duration of each pulse in the pulse train is equal to the duration of the control pulse supplied to one of the inputs of the D to A element, the other input being constant, the averaged output current supplied through the D to A element to the input of operational amplifier 43 will therefore be proportional to the frequency (and accordingly the desired surface machining speed or revolutions per minute).

Assume now that the numerical control system has been structured to operate in the SFM mode, and that the actual cutting radius (initially) of the workpiece in elemental displacement units is 1,000 or 0.1 inch. Under these conditions, only the first flip-flop of the third decade counter in the radius register will be set so that only digital to analog converter element 101$i$ will be switched in because of its received instructions. As a consequence, only the 400 K resistance connected to D to A element 101$i$ will be inserted in the feedback path of variable gain operational amplifier 43. If thereafter, a change in cutting radius occurs and the actual cutting radius becomes 0.08 inch, the next successive D to A element 101$j$ will be switched in so as to connect a 500 K resistor in the feedback path, and D to A element 101$i$ will be switched out due to the change in count in the radius register. At any time therefore the feedback resistance and the gain of the operational amplifier 43 will be changed in inverse proportion with the changes occurring in the cutting radius. In this way, the rotational speed of the spindle can be slaved to the actual cutting radius. Generally, several D to A elements will be switched in at one time for a given radius to provide an inversely proportional gain change in a series of small steps.

It is to be understood that the output of the operational amplifier 43 normally will not control directly the spindle drive motor. Other power amplifiers and controllers will follow in cascade with suitable servo loops and stabilizing networks in order to match the output power with the control power required. This portion of the spindle drive motor control loop is well known in the art of automatic control, and will not be described in greater detail. As part of this additional control loop, it may prove desirable to include a second feedback from the spindle tachometer which can be compared with the output of operational amplifier 43 in order to insure that the spindle speed follows strictly the commanded desired value.

It should also be understood that while the control circuits described herein represent a preferred form of the invention, other embodiments of the invention will be suggested to those skilled in the art in the light of the above teachings. For instance, instead of controlling the gain of the operational amplifier 43 by changing its feedback resistance, it is possible to operate or change the values of the input resistance in the same manner as the speed range changing elements described above. In such a case, since the gain A of the operational amplifier is inversely proportional to the value of the input resistance, the resistors controlled by the output of the radius register through the various digital to analog converter elements as described above should have a weight appropriately designed to accommodate this change in characteristic.

In the above-described embodiment of the invention, the output of the operational amplifier 43 depends upon the frequency or repetition rate of the input pulse train and the adjusted gain of the amplifier. The input frequency or repetition rate of the pulse train is proportional to a command value of cutting speed measured in terms of surface feet per minute or revolutions per minute and may be further tied or slaved to the spindle speed for chip thickness control purposes as described. The output signal obtained from the operational amplifier then will be corrected by changing the resistance of its input path or the resistance of its feedback path so as to account for speed range changes in the transmission gearing and changes in the radius of the part being machined.

Figure 8:
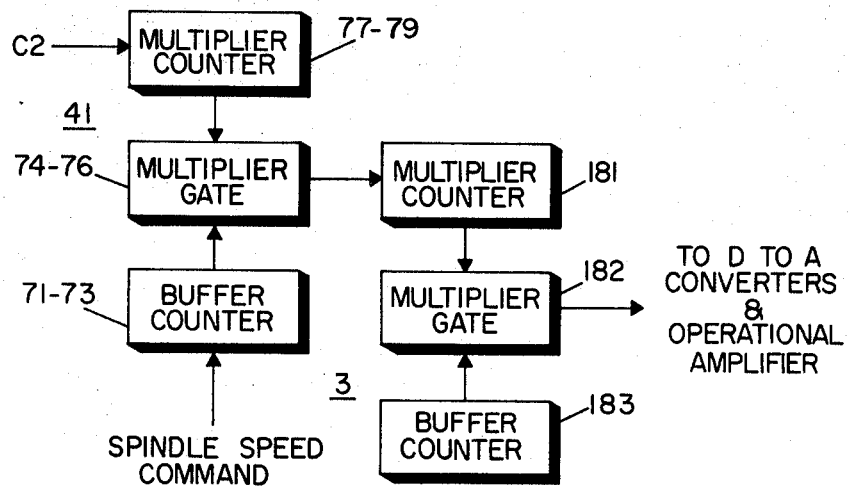
FIG. 8 is a functional block diagram of an alternate form of a suitable change-in-radius speed control counter arrangement that could be employed in practicing the invention.

FIG. 8 of the drawings illustrates another embodiment of the invention wherein a second multiplier counter is employed in order to keep track of the changes in radius of a part being machined. In FIG. 8, the spindle speed command multiplier counter is shown at 41 as comprising the multiplier counters 77–79 that operate the multiplier gates 74–76 in conjunction with the command value of spindle speed stored in the working counters 71–73. Here again the command value of spindle speed is considered to be in terms of surface feet per minute. The output from the multiplier gates 74–76 of spindle speed command multiplier counter 41 is supplied to the multiplier counter stages 181 of a second radius multiplier counter further comprised by multiplier gates 182 and radius register or buffer counter 183. The count stored in the radius register 183 is continuously changed in accordance with the changes in the X axis command feed rate pulse train as described previously so as to clock out of the multiplier gates 182 a spindle speed command pulse train that has been corrected for changes in radius, and that then is supplied to the input of the digital to analog converters and operational amplifier 43. The count in radius register 183 decreases as the cutting radius increases, or vice versa, thus approximating the inverse function relationship for a limited change of radius.

From the foregoing description, it will be appreciated that the invention provides a new and improved automatic control for lathes which is capable of operating either in an SFM or SFM and chip thickness control mode and which utilizes digital numerical control techniques. In the preferred embodiment of the invention, the control selectively may be operated in an SFM mode with or without chip thickness control or may be operated in an RPM mode with or without chip thickness control. While operated in an SFM mode, the angular speed of the lathe spindle $w$ can be numerically maintained according to the actual radius of the part being machined (in the average) so that a suitable cutting speed can be programmed in terms of surface feet per minute of the part being machined moving past the cutter tool tip of the lathe. This feature alone allows for a cutting operation to be programmed in terms of surface feet per minute where it is desirable that this parameter be maintained constant at some pre-programmed value where the machining characteristics of the material require this kind of cutting operation. Further, for those machining operations where it is necessary to control the chip thickness, this can be achieved by slaving the feed rate $v$ to the angular speed of the spindle $w$ so that the feed rate feed is made to be inversely proportional to the cutting radius $r$. Then, by numerically programming spindle speed in terms of a suitable cutting speed measured in surface feet per minute, optimized machining operations can be carried out. Also, if the parameter $F$ is kept constant, risk of chattering can be avoided to provide an optimized cutting operation.

Having described several embodiments of an automatic control for lathes providing SFM and chip thickness control constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed as new and desired to be secured by Letters Patent of the United States is:

1. An SFM control for automatically controlled lathes including feed supply means for automatically feeding a part being machined relative to a cutter tool of the lathe along at least one axis of movement, spindle motor speed control means for controlling the spindle speed of the lathe, and change-in-radius speed control means for deriving a speed control signal related to the change in radius of a part being machined on the automatically controlled lathe, the output speed control signal from said change-in-radius speed control means being supplied to control the spindle speed control means whereby the spindle speed of the lathe is adjusted automatically with changes in radius of a part being machined to maintain a desired value of surface feet per minute moving past the lathe cutter tool, said spindle motor speed control means including an operational amplifier, and means for changing the gain of said operational amplifier in accordance with the change in radius of a part being machined on the automatically controlled lathe whereby the output signals from the operational amplifier automatically are corrected to maintain a desired value of surface feet per minute moving past the lathe cutter tool tip as the part being machined changes in radius.

2. An SFM control for automatically controlled lathes according to claim 1 additionally including gear range selector means for selectively changing the gain of the operational amplifier in accordance with a predetermined selected one of a plurality of speed range changing gear ratios of a selectively changeable gear train employed to drive the lathe spindle.

3. An SFM control for an automatically controlled lathe according to claim 2 wherein the gain of said operational amplifier varies inversely with the radius of a part being machined and inversely with the ratio of spindle speed to spindle motor speed as determined by said selected gear ratio.

4. An SFM-RPM control for lathes according to claim 3 further including spindle speed mode select means for selectively disconnecting the change-in-radius speed control means for controlling the operational amplifier, and means for connecting RPM speed control means to control the gain of the operational amplifier whereby the spindle speed of the lathe selectively may be operated in a desired value of surface feet per minute mode or in a desired value of revolutions per minute mode at pre-programmed command speeds.

5. An SFM-RPM-chip thickness control for lathes according to claim 4 further including means coupled to the lathe spindle for deriving a spindle speed indicating control signal representative of the spindle speed of the lathe, and means responsive to the spindle speed indicating control signal for slaving the feed supply means to the lathe spindle speed so that the feed rate and hence chip removal is proportional to the spindle speed and a controlled thickness of chip removal is achieved.

6. An SFM-RPM-chip thickness control for automatically controlled lathes according to claim 5 further including means coupled to said spindle motor speed control means for controlling the operation thereof selectively either in pre-programmed command values of surface feet per minute of the part being machined moving past the cutter tool tip, or selectively in accordance with preprogrammed values of revolutions per minute of the lathe spindle.

7. An SFM control for automatically controlled lathes including feed rate control servo drive means for automatically controlling the feed rate operation of the lathe along at least one axis of movement in accordance with a set of pre-programmed instructions, a spindle motor, spindle motor speed control means for controlling the spindle speed of the lathe, a selectable ratio gear train driven by the spindle motor, said gear train driving the lathe spindle and change-in-radius speed control means for deriving a speed control signal related to the change in radius of a part being machined on the automatically controlled lathe, said spindle motor speed control means including an operational amplifier and means for changing the gain of said operational amplifier, said gain changing means being responsive to said speed control signal so that the gain of said operational amplifier varies inversely with the radius of the part being machined and inversely with the ratio of spindle speed to spindle motor speed as determined by said selected gear ratio, whereby the spindle speed of the lathe is adjusted automatically with changes in radius of a part being machined to maintain a desired value of surface feed per minute moving past the lathe cutter tool independently of the operation of the feed rate control servo drive means.

8. An SFM-RPM control for lathes according to claim 7 further including spindle speed mode select means for selectively disconnecting the change-in-radius speed control means for controlling the operation of the operational amplifier, and means for connecting in RPM speed control means to control the gain of the operational amplifier whereby the spindle speed of the lathe selectively may be operated in a desired value of surface feet per minute mode or in a desired value of revolutions per minute mode at pre-programmed command speeds.

9. An SFM-RPM-chip thickness control for lathes according to claim 8 further including means coupled to the lathe spindle for deriving a spindle speed indicating control signal representative of the spindle speed of the lathe, and means responsive to the spindle speed indicating control signal for slaving the feed rate control servo drive means to the spindle speed so that the feed rate is proportional to the spindle speed and a controlled thickness of chip removal is achieved.

10. An SFM-RPM-chip thickness control for automatically controlled lathes according to claim 9 further including means coupled to said spindle motor speed control means for controlling the operation thereof selectively either in pre-programmed command values of surface feet per minute to be maintained past the cutter tool tip, or selectively in accordance with pre-programmed values of revolutions per minute of the lathe spindle.

11. An SFM-RPM-chip thickness control according to claim 10 wherein the feed rate control servo drive means automatically controls the feed rate operation of the lathe along at least two mutually perpendicular axes of movement in accordance with a set of pre-programmed instructions.

12. An improved SFM digital numerical control for automatically controlled lathes including command data input means and digitally operable numerical controlled feed rate servo drive means for automatically controlling the feed rate operation of a lathe along at least one axis of movement in accordance with a set of pre-programmed instructions supplied from the command data input means, motor speed control means for controlling the spindle speed of a lathe and including variable gain amplifying means for amplifying a spindle speed controlling signal used to control the speed of the spindle drive motor, and change-in-radius speed control means for deriving a speed control signal related to the change in radius of a part being machined on an automatically controlled lathe, said change-in-radius speed control means comprising radius counter means supplied with an input initial radius value from the command data input of the numerical control and with a change-in-radius input signal from the numerically controlled feed rate servo drive means, and means coupling the output from the radius counter means to the variable gain amplifying means for controllably varying the gain of the variable gain amplifying means in response to changes in radius of the part being machined whereby the spindle speed of the lathe is adjusted automatically to maintain a desired value of surface feet per minute past the lathe cutter tool.

13. An improved SFM digital numerical control according to claim 12 wherein the variable gain amplifying means includes a plurality of selectively operable digital to analog converter means connected in a feedback path for adjustably controlling the gain of the amplifier, and the radius counter means selectively control the digital to analog converter means in accordance with the value of the radius recorded in the counter.

14. An improved SFM-RPM control for lathes according to claim 13 further including spindle speed mode selector means for selectively disconnecting the radius counter means and associated digital to analog converter means connected in the feedback path of the variable gain amplifying means, and means for connecting in a fixed gain RPM speed control means in the feedback path of the variable gain amplifying means whereby the spindle speed of the lathe selectively may be operated in a desired value of surface feet per minute mode or in a desired value of revolutions per minute mode at pre-programmed command speeds.

15. An SFM-chip thickness control for lathes according to claim 12 further including digital encoding means coupled to the lathe spindle for deriving a spindle speed indicating digitized pulse train representative of the spindle speed of the lathe, and means for supplying the spindle speed pulse train thus derived to the digitally operable numerical controlled feed rate servo drive means as an input supply pulse train whereby the operation of the numerically controlled feed rate servo drive means is slaved to the spindle speed of the lathe for automatically controlling the feed rate operation of the lathe relative to the lathe spindle speed through the spindle speed pulse train whereby the feed rate can be made to be proportional to the spindle speed, and a controlled thickness of chip removal can be achieved.

16. An SFM-RPM-chip thickness control for lathes according to claim 14 further including digital encoding means coupled to the lathe spindle for deriving a spindle speed indicating digitized pulse train representative of the spindle speed of the lathe, and means for supplying the spindle speed pulse train thus derived to digitally operable numerical controlled feed rate servo drive means as an input command pulse train whereby the operation of the numerically controlled feed rate servo drive means is slaved to the spindle speed of the lathe for automatically controlling the feed rate operation of the lathe relative to the lathe spindle speed through the spindle speed pulse train whereby the feed rate can be made to be proportional to the spindle speed, and a controlled thickness of chip removal can be achieved.

17. An SFM digital numerical control according to claim 12 further including spindle speed command counter means adapted to derive an output command spindle speed pulse train and designed to be programmed in terms of command values of surface feet per minute of the part being machined moving past the lathe cutter tool, and digital to analog converter means having the output command spindle speed pulse train from the spindle speed command counter means supplied thereto and having its output supplying the variable gain amplifying means with a command spindle speed analog control signal that is proportional to the input command spindle speed pulse train supplied from the spindle speed command counter means.

18. An SFM-chip thickness digital numerical control according to claim 15 further including spindle speed command counter means adapted to derive an output command spindle speed pulse train and designed to be programmed in terms of command value of surface feet per minute of the part being machined moving past the lathe cutter tool, and digital to analog converter means having the output command spindle speed pulse train from the spindle speed command counter means supplied thereto and having its output supplying the variable gain amplifying means with a command spindle speed analog control signal that is proportional to the input command spindle speed pulse train supplied from the spindle speed command counter means.

19. An SFM-RPM-chip thickness control according to claim 16 further including spindle speed command counter means selectively operable to derive an output command spindle speed pulse train calibrated either in terms of surface feet per minute or in terms of revolutions per minute, digital to analog converter means having the output from the spindle speed command counter means supplied thereto for deriving an output analog spindle speed command signal proportional to the command spindle speed pulse train supplied from the spindle speed command counter means, and having the output thereof supplied to the input of the variable gain amplifying means for deriving a spindle speed motor controlling signal measured either in terms of a desired command value of surface feet per minute or in terms of a desired command value of revolutions per minute.

20. An SFM-RPM-chip thickness control according to claim 19 wherein the digital to analog converter means connected intermediate the output of the spindle speed command counter means and the input to the variable gain amplifying means comprises a plurality of digital to analog converter means selectively connected in circuit relationship in accordance with a desired speed range changing gear ratio.

21. An SFM-RPM-chip thickness control according to claim 20 wherein the numerically controlled feed rate servo drive means automatically controls the feed rate operation of the lathe along at least two mutually perpendicular axes of movement in accordance with a set of pre-programmed instructions supplied from the command data input means.

* * * * *